United States Patent [19]
Cuniberti

[11] Patent Number: 5,269,663
[45] Date of Patent: Dec. 14, 1993

[54] ELECTRIC PUMP FOR THE CIRCULATION OF A LIQUID, FOR EXAMPLE IN AN INTERNAL-COMBUSTION ENGINE

[75] Inventor: Francesco Cuniberti, Turin, Italy
[73] Assignee: Iveco Fiat S.p.A., Turin, Italy
[21] Appl. No.: 853,529
[22] Filed: Mar. 18, 1992
[30] Foreign Application Priority Data
Mar. 19, 1991 [IT] Italy .............. T091A000197
[51] Int. Cl.$^5$ .................................. F04B 17/00
[52] U.S. Cl. .................................... 417/356
[58] Field of Search ............ 417/356, 355, 423.7; 415/900; 418/170

[56] References Cited

U.S. PATENT DOCUMENTS

| | | |
|---|---|---|
| 2,703,370 | 3/1955 | Steensen et al. |
| 2,760,348 | 8/1956 | McAdam et al. .............. 417/356 |
| 2,761,078 | 8/1956 | McAdam . |
| 3,194,165 | 2/1962 | Sorlin . |
| 3,932,069 | 1/1976 | Giardini et al. |
| 4,949,022 | 8/1990 | Lipman . |
| 4,984,972 | 1/1991 | Clausen et al. .............. 415/900 |
| 5,044,905 | 9/1991 | Bartl et al. .................. 418/170 |
| 5,078,741 | 1/1992 | Bramm et al. ............... 417/356 |
| 5,112,200 | 5/1992 | Isaacson et al. ............. 417/356 |
| 5,112,202 | 5/1992 | Oshima et al. .............. 417/356 |

FOREIGN PATENT DOCUMENTS

| | | |
|---|---|---|
| 0240674A2 | 2/1987 | European Pat. Off. . |
| 3905278A1 | 9/1989 | Fed. Rep. of Germany . |
| 61-053484 | 7/1986 | Japan . |
| 2017865A | 3/1979 | United Kingdom . |
| 2042279 | 1/1980 | United Kingdom . |

*Primary Examiner*—Richard A. Bertsch
*Assistant Examiner*—Alfred Basichas
*Attorney, Agent, or Firm*—Kane, Dalsimer, Sullivan, Kurucz, Levy, Eisele & Richard

[57] ABSTRACT

The electric pump comprises a stationary body which defines a chamber for the liquid and in which is mounted to rotate an impeller body provided with a series of blades. The inductor and the armature of a brushless electric motor are formed by two inserts which are embedded in the material of the two bodies during the corresponding moulding thereof. The armature is formed by a series of permanent magnets mounted on a ring of ferromagnetic material and it can be disposed in alignment with the blades of the impeller body.

3 Claims, 3 Drawing Sheets

ELECTRIC PUMP FOR THE CIRCULATION OF A LIQUID, FOR EXAMPLE IN AN INTERNAL-COMBUSTION ENGINE

BACKGROUND OF THE INVENTION

The present invention relates to an electric pump for the circulation of a liquid, for example in a circuit of an internal-combustion engine.

Usually the pumps for the circulation of a liquid, for example the engine coolant, are driven by the driving shaft via means for the transmission of motion, such as pulleys and/or gearwheels. These means require rolling bearings which, in turn, need to be lubricated and involve the presence of fluid-tight rotating means; any defect in the serviceability of the latter often leads the to entire assembly being put out of action. A typical drive system uses belts or gears with a fixed transmission ratio with the engine; as a result, the output and thus the power adsorbed are determined by engine speed and not by the actual requirements. Consequently, in many operating ranges, there is unnecessary excess output with an attendant waste of energy.

There are also known electric pumps of the above type, wherein the inductor and/or the armature is incorporated in the stationary body and in the impeller of the motor. These known pumps are however generally unreliable and expensive to manufacture.

SUMMARY OF THE INVENTION

It is the object of the invention to provide an electric pump for the circulation of liquids, which is of maximum simplicity and which eliminates the abovementioned disadvantages of the hitherto known pumps.

This object is achieved by the electric pump according to the invention, which comprises a stationary body delimiting a liquid-collection chamber, an impeller body mounted to rotate on said stationary body and provided with pumping members for the liquid in said chamber, and an electric motor comprising an inductor and an armature each of which is incorporated in one of said bodies, said bodies being made from plastics material or non-magnetic metallic material, and which is characterized in that said inductor includes an electric winding wound on to a group of pole pieces integral with a first ring of ferromagnetic material and forms an insert embedded in the material of said stationary body, said armature comprising a plurality of permanent magnets secured to a second ring of ferromagnetic material and forming an insert embedded in the material of said impeller body.

BRIEF DESCRIPTION OF THE DRAWINGS

With a view to a better understanding of the present invention, preferred embodiments of the electric pump will be described below by way of example and with reference to the accompanying drawings, wherein.

DETAILED DESCRIPTION OF THE INVENTION

Figure 1:
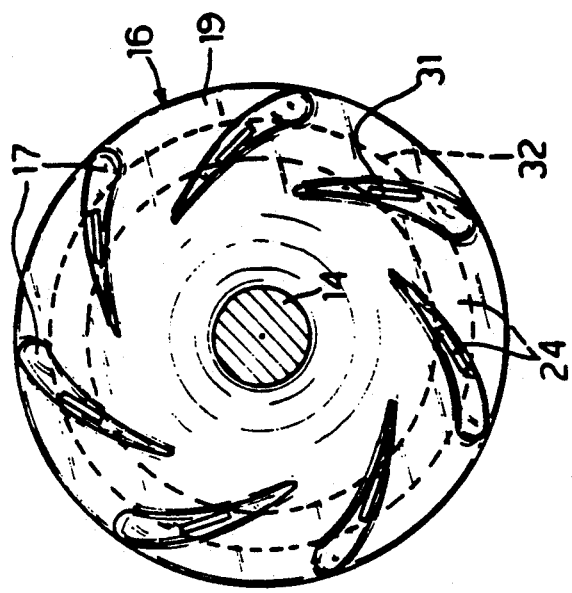
FIG. 1 is a schematic median section of an electric pump for the circulation of the coolant for an internal-combustion engine in accordance with a first embodiment of the invention.

Referring now to FIG. 1, the reference numeral 10 generally designates an electric pump for the circulation of a liquid, in particular cooling water, which is conveyed in the appropriate circuit in the cylinder block and in other parts of an internal-combustion engine. The electric pump 10 comprises a stationary body 11 which delimits a chamber 12 in the form of a solid of revolution. The circulating liquid is conveyed into the chamber 12 through an inlet duct 20 and a pair of passages 15 provided on the body 11.

Figure 2:
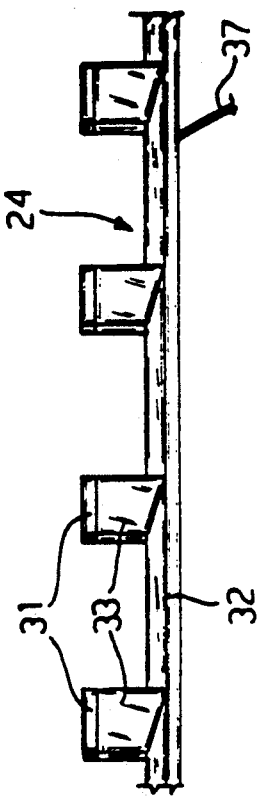
FIG. 2 is a section along a line II—II in FIG. 1.
Figure 3:
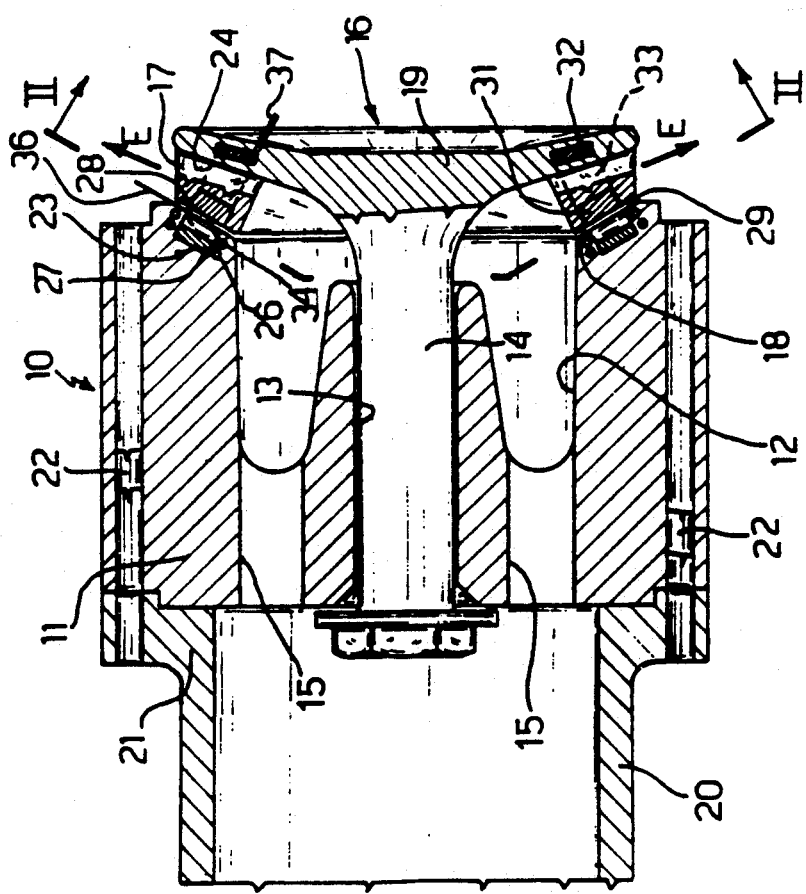
FIG. 3 is a cylindrical development of a detail of FIG. 2.

The body 11 is also provided with an axial bore 13, in which is mounted to rotate a shaft 14 formed integrally with an impeller body 16 which will be simply called impeller in the following. The latter is provided with a series of blades 17 (FIG. 2) projecting towards a surface of revolution 18 of the stationary body 11. In the embodiment of FIGS. 1 and 2, the surface 13 is frustoconical and the blades 17 are disposed on a disc-like portion 19 of the impeller 16 acting as a thrust bearing. Each blade 17 is shaped substantially in the form of a spiral portion. Therefore, during the rotation of the impeller 16, the blades 17 expel the liquid from the chamber 12 in the direction indicated by arrows E in FIG. 1. On the side opposite the surface 18 the body 11 is fluid-thightly connected with a flange 21 of the duct 20 by means of a plurality of bolts 22.

The pump is driven by an electric operating device comprising a direct-current electric motor 23 of per se known brushless type. According to the invention, said electric motor comprises an inductor 23 and an armature 24, which are incorporated respectively in the stationary body 11 and in the impeller 16. The body 11 and the impeller 16 can be made from various materials and can be produced using suitable moulding dies. Preferably, said elements are made from plastics material in view its favourable properties in respect of ease of moulding, electrical insulation, capacity to slip in sliding engagement in the presence of liquids which are not particularly lubricating (water for example), corrosion resistance, etc. The inductor 23 and the armature 24 of the electric motor are embedded at least partially in the material of the body 11 and of the impeller 16.

In particular, the body 11 and the impeller 16 are made of plastics materials. For its part, the inductor 23 is formed by an electrical winding 26 arranged on a ring 27 of ferromagnetic material, forming conventional pole pieces 28. The winding 26 is connected to a conventional pulse generating electronic circuit which is per se known and which is carried by said inductor 23.

The inductor 23 is embedded in the portion of the body 11 adjacent the surface 18, in the form of an insert during the moulding operation. The pole pieces 28 can be flush with the surface 18 or it can be covered with a thin layer of plastics material 29 which protects the pole pieces from corrosion caused by the liquid being pumped.

For its part, the armature 24 is formed by a series of permanent magnets 31, each of which is embedded during moulding, in the form of an insert, in the end of a blade 17 of the impeller 16. These magnets 31 are magnetised in alternately opposing directions so as to present to the inductor 23 alternately a north pole and a south pole.

For the purpose of closing the magnetic circuit, the magnets 31 are secured to an interconnecting ring 32 of ferromagnetic material and embedded in the disc-like portion 19 of the impeller 16. The ring 32 is provided with a series of substantially radial projections 33, at the end of each of which is secured a corresponding magnet 31.

The armature 24 is embedded in the impeller 16 so that each projection 33 forms a core for the respective blade 17. The corresponding magnet 31 can be disposed flush with the conical outer surface of the blade 17. However, because in use the blades are immersed in the circulating liquid, preferably the magnets 31 are embedded so as to be completely covered by a thin layer of plastics material 34 which provides protection for the magnet 31 against corrosion caused by the liquid.

Additionally, with a view to the correct positioning of the insert 23 in the die for the body 11 and the insert 24 in the die for the impeller 16, before the moulding operation respective tabs 36 and 37 of stainless steel are welded to each of the two rings 27 and 32. The tabs 36 and 37 are arranged so that they protrude from the die at a point remote from the pole pieces 28 and magnets 31 respectively. After the moulding operation, the exposed portion or tail of the tabs 36, 37 is cut off, thereby leaving only the section thereof exposed, which in any case is not subject to corrosion.

The above-described arrangement of the inductor 23 and of the armature 24 has the advantage that the heat generated therein by the excitation of the winding 26 is continuously dissipated by the circulating liquid, thereby obviating any overheating, particularly if plastics material is the appropriate choice of material.

Figure 4:
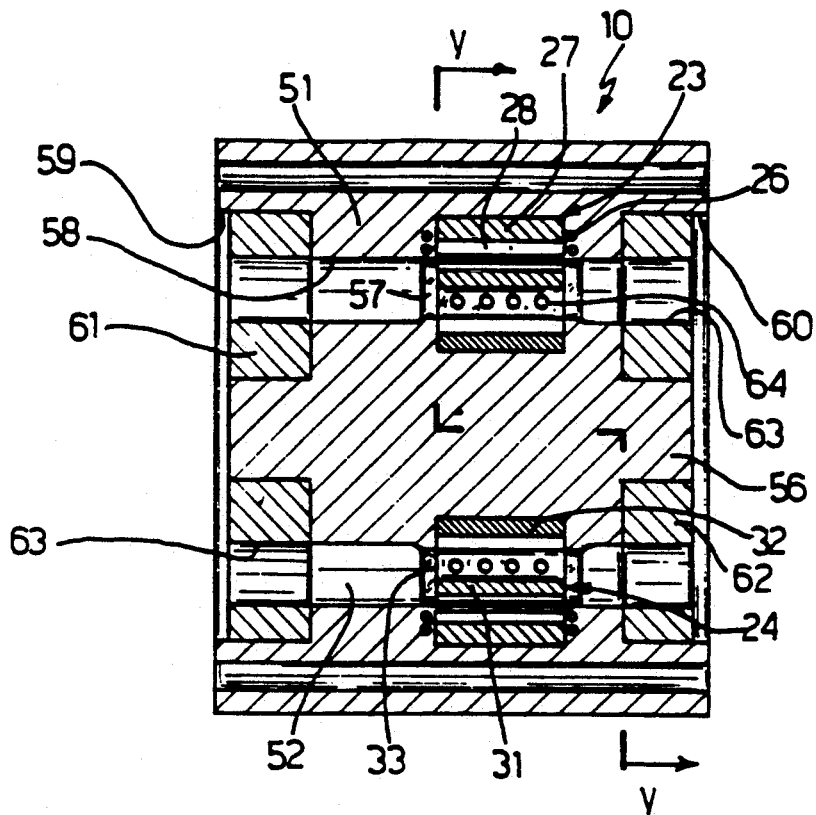
FIG. 4 is a median section of the electric pump in accordance with another embodiment of the invention.
Figure 5:
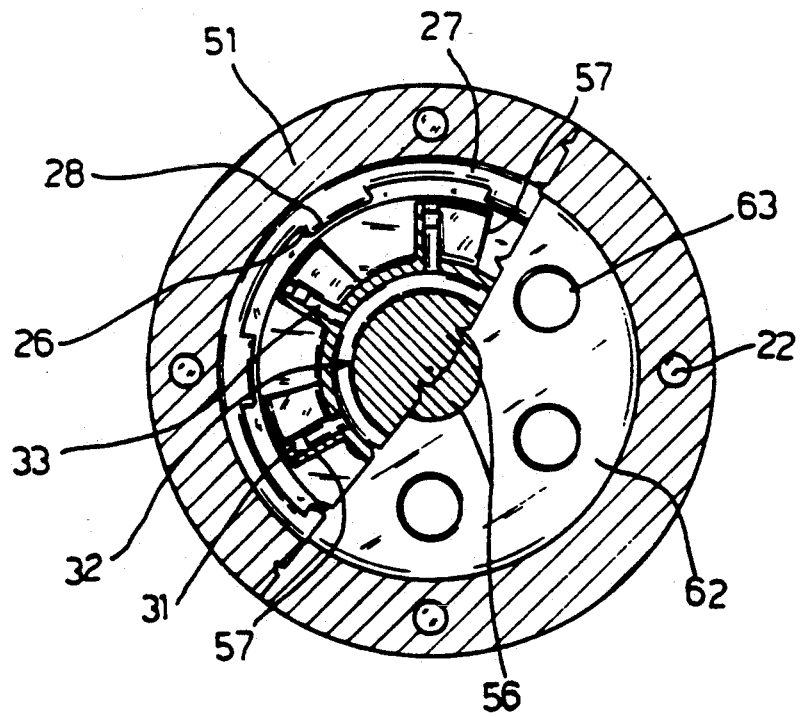
FIG. 5 is a section along a line V—V of FIG. 4.

According to the embodiment of FIGS. 4 and 5, which represent an axial version of the electric pump with magnets incorporated in the blades and able to oppose the thrust of the liquid against the electromagnetic thrust so as to improve the balancing, the stationary body 51 is of tubular shape with a cylindrical inner surface 58. The impeller 56 is also of cylindrical shape with a series of radially directed blades 57 which are substantially helically shaped. Therefore, the stationary body 51 forms with the impeller 56 an annular chamber 52 for collecting the liquid to be pumped.

At its two ends the stationary body 51 is provided with two annular seatings 59 and 60, in which are fitted two corresponding rings 61 and 62 which form two bearings for the rotation of two portions 63 of the impeller 56 having reduced diameter. Each of the two rings 61 and 62 is provided with a series of circumferentially arranged holes 64 which allow the liquid to pass through the chamber 52. Therefore, the ring 61 constitutes a diffuser for the liquid in the chamber 52, whereas the ring 62 contributes a distributor for the liquid towards the circulating circuit.

The inductor 23 is embedded in the stationary body 11 flush with its inner surface, in an analogous manner to that in accordance with the embodiment of FIG. 1. Here too, the armature 24 comprises a ring 32 having a series of radial projections 33 for supporting the magnets 31. It is embedded in the impeller 56 so that each projection 33 forms the core for the corresponding blade 57, as is the case in FIG. 1. Therefore, this embodiment also has the advantage of dissipating the heat generated during operation by means of the circulating liquid.

Additionally, the projections 33 are each provided with a number of holes 64 adapted to allow anchoring of the material of the impeller 56 during the moulding operation. In this case too, both the inductor 23 and the armature 24 can be provided with stainless steel projections to allow relative positioning in the dies during the moulding operation.

Figure 6:
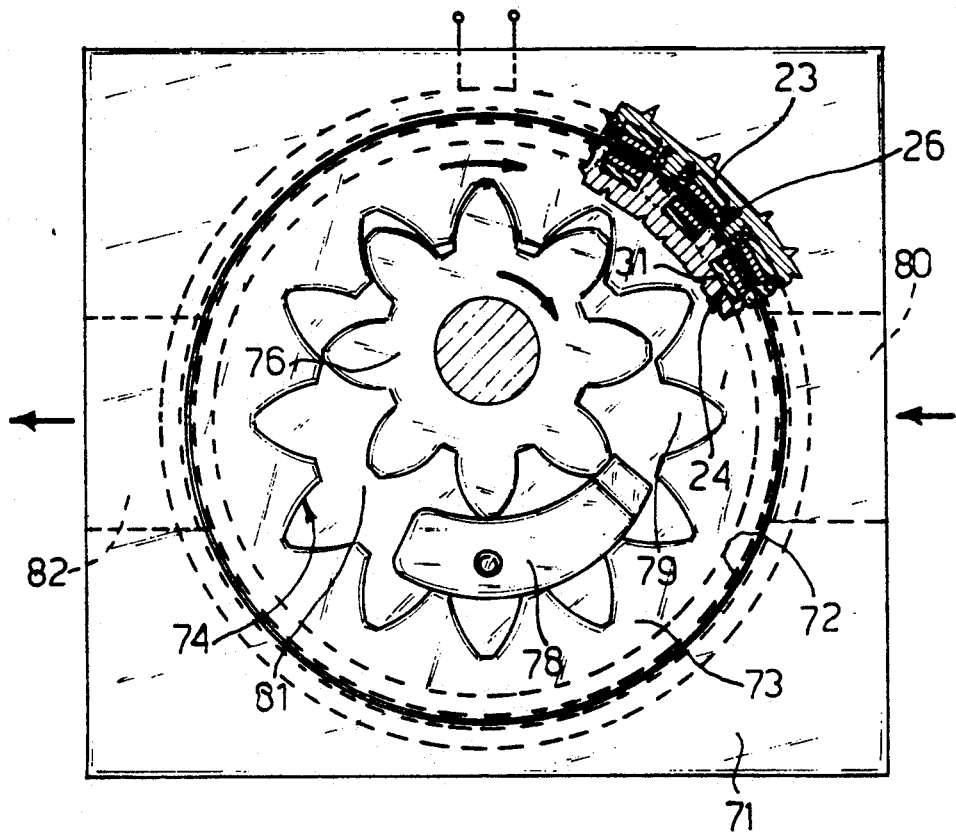
FIG. 6 is a schematic section of another embodiment of the electric pump, but for the circulation of oil.

The electric pump 10 illustrated in FIG. 6, which is intended for pumping oil, has a stationary body 71 provided with a cylindrical inner chamber 72 which accommodates, in a freely rotating manner, a disc 73 defining a ring gear 74 provided with an internal toothing. The stationary body 71 accommodates, embedded in the stationary body 71 itself and facing ring gear 74, in an analogous manner to the embodiment of FIGS. 4 and 5, the windings 26, the pole pieces 28 and the ring 27 forming the inductor 23, whereas the ring gear 74 accommodates in the vicinity of its outer periphery a plurality of permanent magnets 31 interconnected by the ring 32 forming the armature 24. The internal toothing of the ring gear 74 is engaged by a corresponding gearwheel 76 of smaller dimensions with respect to the inner diameter of the ring gear 74 and supported eccentrically and rotatably by the stationary body 71.

A separating element 78 fixed to the stationary body 71 is inserted in the space between the ring gear 74 and the gearwheel 76, in the zone of maximum mutual distance apart, and it divides this space into an intake portion 79 connected to an oil-inlet orifice 80 provided in the stationary body 71, and a delivery portion 81 connected to an outlet orifice 82 also provided in the stationary body 71, on the side opposite the orifice 80.

The supply of current to the inductor 23 thus induces the rotation of the ring gear 74 and, therefore, of the gearwheel 76, whereupon in known manner the oil situated between the teeth of the gearwheel 76 and of the ring gear 74 is transferred from the intake portion 79 to the delivery portion 81.

The advantages of the electric pump 10 of the invention with respect to known pumps are evident from the foregoing. In fact, on the one hand, the electric pump 10 is very simple to manufacture and to assemble owing to the lack of any motion-transmitting mechanism between the engine shaft and the pump. On the other hand, the speed of the electric motor driving the pump can be easily controlled by electronic means, whereby it is possible to reduce consumption by decreasing the output of the pump when the engine is cold and increasing it when the engine temperature reaches its normal operating level and by generally adapting the output to the actual requirements of the engine.

It is evident that the electric pump described above could undergo various other modifications and improvements, without thereby departing from the scope of the claims. For example, the shape of the stationary body and of the impeller could undergo further modification. In particular, in the variant of FIG. 1, it is possible to provide a ring of the same material as the impeller, which joins all the ends of the blades and which partially embeds the permanent magnets 31 below its surface facing the inductor 23 and thus also acts as a thrust bearing surface. In turn, the circuit generating actuating pulses can be separate from the electric pump.

I claim:

1. An electric pump for the circulation of the lubricating oil of an internal-combustion engine, comprising;
   a stationary body (71);
   an impeller body comprising a disc (73) having an internal ring-gear (74) and mounted to rotate on said stationary body (71), said impeller body being provided with a gearwheel (76) rotatably supported by said stationary body (71), said gearwheel (76) having a diameter smaller than the one of said ring-gear (74) and being mounted eccentrically with respect to said ring-gear (74) to delimit an oil-collection chamber (79, 81) for pumping the oil in said chamber (79, 81);

a brushless electric motor (23, 24) including an inductor (23) having an electric winding (26) wound on to a group of pole pieces (28) integral with a first ring (27) of ferromagnetic material, said motor (23, 24) further including an armature (24) having a plurality of permanent magnets (31) secured to a second ring (32) of ferromagnetic material;

wherein said magnets (31) and said second ring (32) are completely embedded as an insert into the material of an outer surface of said disc (73);

and wherein said winding (26), said pole pieces (28) and said first ring (27) are completely embedded as an insert into the material of an inner cylindrical surface (72) of said stationary body (71) to face said magnets (31).

2. An electric pump according to claim 1, wherein a separating element (78) is inserted between said gearwheel (76) and said ring-gear (74), said separating element (78) dividing said oil collection chamber into an intake portion (79) and a delivery portion (81), said disc (73) being accommodated in a cylindrical chamber (72) formed in said stationary body (71).

3. An electric pump according to claim 1, wherein said second ring is provided with a series of projections (33) each one connected to one of said magnets (31), each one of said projections (33) forming a core of the corresponding blades (17, 57).

* * * * *